Patented Nov. 22, 1949

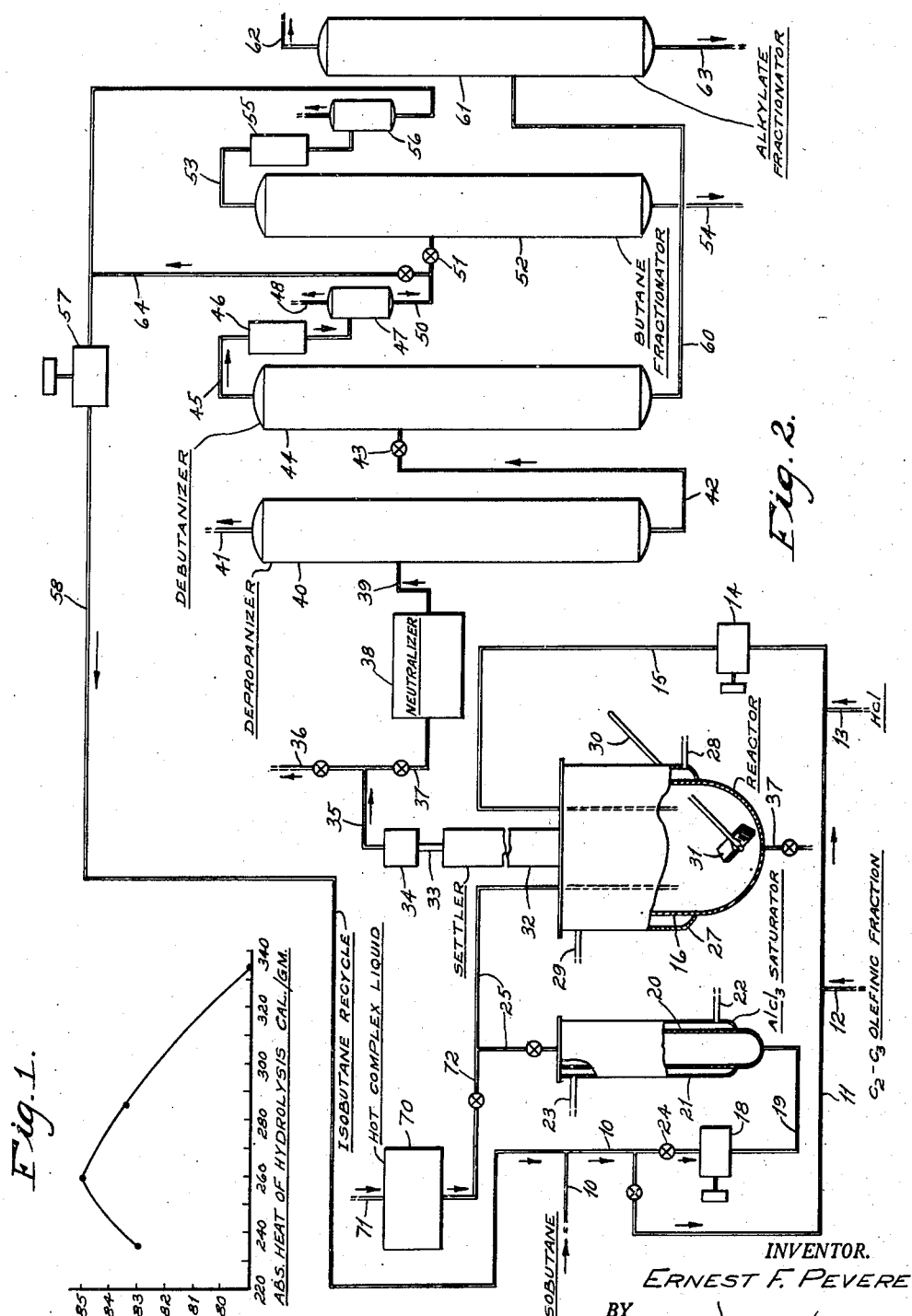

2,488,603

UNITED STATES PATENT OFFICE 2,488,603

PROPYLENE ALKYLATION WITH ALUMINUM CHLORIDE COMPLEX CATALYST

Ernest F. Pevere, Beacon, N. Y., assignor to The Texas Company, New York, N. Y., a corporation of Delaware Application November 29, 1946, Serial No. 713,118

2 Claims. (Cl. 260—683.4)

This invention relates to catalytic alkylation of isobutane with propylene in the presence of an aluminum chloride-hydrocarbon complex catalyst of controlled activity.

The principal object of the present invention is to provide a continuous method of alkylating isobutane with propylene, or with a typical refinery fraction containing propylene, so as to secure a good yield of a high quality alkylate suitable for premium motor fuel, while at the same time securing greatly improved catalyst life.

The catalytic alkylation of isobutane with propylene with various types of aluminum chloride catalysts, and in the presence of a hydrogen halide promoter, has heretofore been proposed. However, the quality of the propylene alkylate from the previously known processes employing an aluminum chloride catalyst has been comparatively poor, resulting in a 375° F. E. P. product having a clear CFRM octane of around 80 and below; and the catalyst life has been so short as to make the processes economically unattractive. The use of an aluminum chloride-hydrocarbon complex liquid catalyst prepared by reacting isobutane and propylene in situ with aluminum chloride has also been proposed for this purpose (see U. S. Patent No. 2,407,390). However, in accordance with the continuous alkylation method of that patent, employing such a complex liquid catalyst as formed in situ with a reaction period of about 4–5 hours, it has been found necessary to limit the weight of aluminum chloride present in the complex on the basis of the total hydrocarbons in the reaction zone to about 3 to 7%, which means a catalyst to hydrocarbon volume ratio in the reactor of roughly about 0.03 to 0.07:1. While a batch operation with a relatively slow rate of feed of the propylene charge to the reactor with this small amount of catalyst is capable of producing fairly good results with respect to yield and quality of the alkylate, difficulties are encountered in continuous operation at commercially desirable charge rates, with the result that the yield of desired alkylate is materially reduced and catalyst life is poor.

It has now been discovered that a satisfactory yield of high quality propylene alkylate can be produced with excellent catalyst life by employing a complex liquid catalyst of this character which has been preconditioned by reaction with isobutane and a normally gaseous olefin of higher molecular weight than ethylene, preferably propylene, for a period of time in excess of about 18 hours until the complex liquid catalyst contains sufficient reaction product of isobutane and the normally gaseous olefin with the aluminum chloride content of the complex liquid to reduce the absolute heat of hydrolysis of said catalyst to within the range of about 245–283 small calories per gram of complex liquid. Further, it has been found that by employing this preconditioned complex liquid in a continuous isobutane-propylene alkylation process, wherein the catalyst to hydrocarbon volume ratio in the reactor is maintained at least 0.6:1, and preferably about 0.8:1 to 2:1 or higher, at a temperature of about 50 to 90° F., good yields of alkylate, wherein the 375° F. E. P. fraction has a clear CFRM octane of about 83–85 and higher up to about 89, can be secured with a catalyst life in excess of 25 gallons of alkylate per pound of aluminum chloride consumed.

While the complex liquid catalyst can be prepared in situ and then preconditioned for the substantial length of time specified, it is preferred to initially prepare a fresh complex liquid by reacting aluminum chloride with kerosene or naphtha in the presence of HCl. By way of specific example, a typical aluminum chloride-hydrocarbon complex liquid was prepared by reacting kerosene with aluminum chloride and anhydrous HCl at 210° F. for 4½ hours, utilizing 1000 grams of aluminum chloride, 1628 grams of kerosene, and 50 grams of HCl under the conditions specified above, followed by separation of the resulting complex liquid from the unreacted kerosene by decantation, washing of the separated complex liquid with commercial pentane, and finally removing the dissolved pentane by distillation, 1400 grams of a mobile complex liquid catalyst were obtained. This catalyst had an apparent heat of hydrolysis on mixing with water in a calorimeter of approximately 320 small calories per gram of complex liquid. By calibration of the calorimeter, it has been determined that a correction factor of 6% of the apparent value should be added to that value to convert it to the absolute heat of hydrolysis value, which latter includes the heat absorbed by the calorimeter itself. This correction factor of 6% applies to all the apparent heat of hydrolysis values referred to herein. Consequently, it is seen that the absolute heat of hydrolysis of said freshly prepared kerosene complex liquid was about 339 calories per gram, which is far above the effective range of the present invention. Likewise, when the catalyst liquid is formed in situ by reacting isobutane and propylene with aluminum chloride under alkylating conditions for an induction period of around 4–5 hours, the resulting complex liquid so produced invariably has an absolute heat of hydrolysis value in excess of 300 calories per gram.

The present invention is illustrated in the drawing, wherein:

Fig. 1 is a graph showing a curve plotting ASTM octane number of the 375° F. E. P. alkylate against absolute heat of hydrolysis in calories per gram of the complex liquid catalyst, illustrating the critical nature of the heat of hydrolysis value of the complex liquid in isobutane-propylene alkylation in accordance with the present invention; and Fig. 2 is a diagrammatic view of apparatus for carrying out the continuous alkylation process of the present invention on a $C_2$–$C_3$ olefinic refinery fraction.

The present invention involves a combination of the particular complex liquid catalyst of controlled low heat of hydrolysis range, wherein the catalyst is maintained within that range throughout the continuous operation, together with the maintenance of a high catalyst to hydrocarbon volume ratio in the reactor. The operation is carried out under the usual liquid phase conditions, employing a substantial molar excess of isobutane to propylene and, preferably, with efficient agitation. A contact time within the range of about 15 to 60 minutes is suitable, with around 20–30 minutes being preferred.

A substantial proportion of normal paraffin diluent, such as propane, can be tolerated in the reaction mix. Moreover, under the operating conditions of the present invention, isobutane can be selectively alkylated with propylene in the presence of ethylene. Consequently, a suitable olefinic charge stock is the $C_2$–$C_3$ refinery fraction obtained from typical thermal or catalytic cracking operations. The present invention enables this fraction to be employed directly, thereby avoiding the expensive low-temperature high-pressure fractionating operation required to separate $C_2$ from $C_3$ without substantial loss of propylene. However, it will be understood that propylene from any suitable source can be utilized. The isobutane for reaction therewith can be obtained by normal butane isomerization, fractionation of natural gasoline or from any other suitable source.

The following batch runs in Table I illustrate the effect of the heat of hydrolysis of the complex liquid catalyst on the quality of the alkylate, when the operation is carried out with a weight of aluminum chloride present as complex of about 20–33% based on the total hydrocarbon in the reaction zone at the end of the run. Each of these runs was carried out in the usual batch reactor equipped with mechanical stirrer, wherein the $C_4$ paraffin hydrocarbon consisting of 95% by volume of isobutane and 5% by volume of normal butane, together with the complex liquid were first added to the reactor, and then the specified weight of $C_3$ olefinic hydrocarbon consisting of 94.5% by volume of propylene and 5.5% by volume of propane was uniformly added with agitation over a period of 60 minutes, followed by 15 minutes of additional stirring time:

TABLE I

| | Batch Runs | | | | |
|---|---|---|---|---|---|
| | 1 | 2 | 3 | 4 | 5 |
| *Conditions* | | | | | |
| Temp., °F | 60 | 70 | 70 | 70 | 70 |
| Olefin addition time, min | 60 | 60 | 60 | 60 | 60 |
| Added stirring time, min | 15 | 15 | 15 | 15 | 15 |
| *Charge* | | | | | |
| $AlCl_3$ complex, gm | 800 | 780 | 695 | 650 | 530 |
| Apparent heat of hydrolysis cal./gm | 316 | 265 | (1) | (2) | (2) |
| $C_4$ paraffin hydrocarbon, gm | 1,430 | 1,430 | 1,430 | 1,430 | 1,430 |
| Isobutane 95 vol. percent. | | | | | |
| N-butane 5 vol. percent. | | | | | |
| $C_3$ olefinic hydrocarbon, gm | 210 | 210 | 210 | 180 | 210 |
| Propylene 94.5 vol. percent. | | | | | |
| Propane 5.5 vol. percent. | | | | | |
| *Products* | | | | | |
| Stabilized Hydrocarbon, gm | 470 | 435 | 335 | 380 | 300 |
| Pentane Alkylate, gm | 453 | | | 643 | |
| CFRM Octane No. of 375° F. E. P. Fraction | 79.5 | 83.4 | | 85.0 | |

¹ Used complex from Run No. 2.
² Used complex from two previous runs—Average apparent heat of hydrolysis about 245.

In run 1, employing a complex having an apparent heat of hydrolysis of 316 (absolute heat of hydrolysis 335), with a weight of aluminum chloride present as complex of about 33% based on total hydrocarbon (aluminum chloride content of this complex runs about 68 weight percent), it will be noted that the clear CFRM octane number of the 375° F. E. P. fraction of the stabilized alkylate was 79.5. However, starting in run 2 with a complex liquid having an apparent heat of hydrolysis of 265, and utilizing the resulting complex from run 2 in run 3, the 375° F. E. P. fraction of the combined stabilized alkylates from both runs had a clear CFRM octane number of 83.4. This represents substantially the upper limit of the heat of hydrolysis range of the present invention.

In runs 4 and 5, where the complex had an average apparent heat of hydrolysis value of around 245, the 375° F. E. P. fraction of the combined alkylates had a CFRM octane number of 85.

The results of the series of batch runs are plotted in the graph of Fig. 1 to obtain the curve as shown. In this graph the absolute heat of hydrolysis of the complex liquid in calories per gram is plotted as abscissa and the clear ASTM octane number of 375° F. E. P. alkylate fraction is plotted as ordinate. From the curve, it will be seen that complex liquid having an absolute heat of hydrolysis value within the range of approximately 245 to 283 produces 375° F. E. P. deisobutanized alkylate having clear CFRM octane numbers of above 83, and more specifically ranging from 83.4 to 85. While about 85 octane number alkylate was the optimum produced under the particular conditions of these batch runs, the indications are that ceiling quality propylene alkylate of about 89 octane number can be produced under optimum conditions with the complex liquid catalyst within the controlled heat of hydrolysis range specified above. The curve drops sharply as the absolute value increases beyond 283, giving the characteristic propylene alkylate with the aluminum chloride catalyst as heretofore employed of below 80 octane number as the absolute value exceeds 320. The latter value is characteristic of freshly prepared complex liquids without the conditioning treatment.

Further, it will be noted that the curve is also dropping sharply on the left-hand side of Fig. 1 as the absolute heat of hydrolysis value is lowered below 245. Moreover, it is found that at about this point some unsaturation occurs in the alkylate product and the yield of 375° F. E. P. fraction also drops, indicating that the catalyst activity is too low for satisfactory propylene alkylation.

The following continuous runs of Table II illustrate the effect of catalyst to hydrocarbon volume ratio in the reaction zone on yield and catalyst life in continuous operation. These runs were carried out in a so-called draft tube reactor having a superposed inclined settler of large capacity where the complex liquid immediately dropped out of the hydrocarbon mix overflowing thereto, and this complex liquid was returned by a gravity flow line to the reactor. A hydrocarbon charge of the composition shown was continuously supplied to the reactor, and hydrocarbon reaction product separating as the superposed layer in the inclined settler was continuously removed. The conditions of operation in runs 6 and 7 were essentially similar, except that in run 7 hydrogen gas was introduced along with the hydrocarbon charge. This caused a substantial holdup of complex liquid in the inclined settler, due to the resulting hydrogen pressure, so that the actual catalyst to hydrocarbon volume ratio in the reactor was substantially less than in run 6. In both runs, the reactor was initially charged with the indicated amount of complex liquid catalyst, the reactor then filled with isobutane and brought to temperature, and then the hydrocarbon charge was introduced at the rate of 3.3 pounds per hour. The following table presents the conditions and results of these runs:

TABLE II

|  | Continuous Runs | |
| --- | --- | --- |
|  | 6 | 7 |
| Conditions: | | |
| Temp., °F | 60 | 60 |
| Pressure, p. s. i | 500 | 500 |
| Isobutane/propylene mol ratio | 3.3 | 3.3 |
| Hydrogen added | No | Yes |
| AlCl₃ complex, grams | 1,210 | 1,200 |
| AlCl₃ complex, cc | 890 | 883 |
| Apparent heat of hydrolysis cal./grams: | | |
| At start of run | 287 | 294 |
| After approximately 80 hrs | 225 | |
| Hydrocarbon charge rate, lb./hr | 3.3 | 3.3 |
| Contact time, minutes | 20 | 20 |
| Catalyst/hydrocarbon vol. ratio in reactor | 0.9–1.0 | ¹ Less than 0.5 |
| Hydrocarbon Charge, Weight Per cent: | | |
| Propylene | 17.3 | 17.3 |
| Propane | 1.0 | 1.0 |
| Isobutane | 78.1 | 78.1 |
| N-butane | 3.6 | 3.6 |
| Product: | | |
| Total yield alkylate average weight per cent on basis of propylene charged | 209 | 173 |
| Yield, 375° F. E. P. alkylate | 191 | 132 |
| CFRM octane of 375° F. E. P. alkylate: | | |
| From first 24 hrs. of run | 80.8 | 81.2 |
| From next 24 hrs. of run | 82.8 | |
| From next 10 hrs. of run | 82.8 | |
| Catalyst life vol. alkylate/vol. catalyst | 57.5 | 17.3 |

¹ Estimated from observed catalyst holdup in settler due to hydrogen pressure.

The presence of hydrogen was recognized as having substantially no deleterious chemical effect on the reaction. The differences in results are attributable to the actual differences in catalyst to hydrocarbon volume ratio in the reactor. Both the yield of total alkylate and the yield of 375° F. E. P. fraction were substantially lower in run 7, operating at an effective catalyst to hydrocarbon volume ratio below 0.5, than they were in run 6, operating at a catalyst to hydrocarbon volume ratio of about 0.9 to 1.0, although this may be due in part to the sweeping effect of the hydrogen, causing some propylene to pass unreacted through the system. However, the differences in catalyst life are striking, being more than three times greater in run 6 than in run 7; and this is attributable primarily to the difference in catalyst to hydrocarbon ratio. Both of these runs were catalyst depletion runs in which no additional aluminum chloride was added. This further illustrates the fact that the desired high quality of the propylene alkylate is difficult to secure in continuous operation on a catalyst depletion basis starting with a complex liquid having a heat of hydrolysis above the desired range specified, and ending with a complex having a heat of hydrolysis value below that range. On the other hand, where the heat of hydrolysis value is continuously maintained throughout continuous operation within the specified range, then the desired high quality of propylene alkylate having a CFRM octane value above 83 and up to about 89 is secured in good yield at catalyst to hydrocarbon volume ratios in excess of 0.6 and preferably about 0.8 and above.

Referring more particularly to Fig. 2 of the drawing, the isobutane feed, including both fresh and recycled isobutane, is introduced by line 10. This feed is divided with a portion passing by line 11 for mixing with the C₂–C₃ olefinic fraction from line 12. The amount of isobutane supplied by line 10 is, preferably, in molar excess of the propylene content of the C₂–C₃ fraction supplied by line 12, generally of the order of about 2:1 or higher; and the over-all isobutane to olefin feed ratio is maintained within the range of about 3:1 to 8:1. A small proportion of HCl, sufficient to maintain a concentration of HCl within the reactor of less than 0.2% by weight on the basis of the hydrocarbon feed, and generally of the order of about 0.02–0.1%, is introduced by line 13. The resulting mixed feed is forced by pump 14 through line 15 into reactor 16.

The balance of the isobutane feed is passed by pump 18 and line 19 into the lower portion of an aluminum chloride saturator 20, which is filled with lump aluminum chloride. The saturator is provided with a water jacket 21, through which hot water is passed by lines 22 and 23 to maintain the saturator at a mildly elevated temperature of the order of about 150–190° F. Adequate control of the amount of aluminum chloride dissolved in the isobutane stream passing in liquid form through the saturator 20, is effected by regulating valve 24 to control the proportion of isobutane diverted to the saturator and by regulating the temperature and rate of supply of hot water supplied to jacket 21. The resulting isobutane stream containing dissolved aluminum chloride passes by a lagged line 25 to reactor 16.

A suitable type of agitated reactor is diagrammatically illustrated in the drawing. This comprises a cylindrical vessel equipped with a cooling jacket 27 through which cooling water is circulated by lines 28 and 29. This is a side stirred reactor having a driven shaft 30 passing through a suitable stuffing box in the side wall and carrying in the lower portion of the reactor agitating blades 31. Surmounting the reactor and freely communicating therewith is a long column providing a settling zone 32 which communicates at its upper end by line 33 with sight glass 34 and overflow line 35.

In starting operation, the reactor 16 is supplied with sufficient aluminum chloride-hydrocarbon complex liquid to provide a catalyst to hydrocarbon ratio therein of the order stated above and usually about 1:1. The balance of the reactor system is then filled with isobutane. A feed stream of mixed isobutane, $C_2$–$C_3$ fraction, and HCl, is then continuously introduced by line 15 for the conditioning period of approximately 18–36 hours to reduce the heat of hydrolysis of the complex liquid to within the effective range set forth above. The reactor system is maintained under sufficient pressure of the order of about 100–250 pounds per square inch or higher, so as to maintain at least the $C_3$ and higher hydrocarbons of the feed in liquid phase. Emulsion formed within reactor 16 passes upwardly into the quiescent settling zone 32, where the complex liquid drops out and returns to the reactor. A clear hydrocarbon stream consisting of alkylate, excess isobutane, unreacted $C_2$ hydrocarbons, and propane, overflows by line 35 and is, preferably, diverted to separate tankage during the conditioning period by the valve controlled line 36. Samples of the complex liquid may be removed from the reactor from time to time by the valve controlled bottom drawoff 37 and analyzed for heat of hydrolysis.

When the complex liquid within the reactor system has been conditioned to the proper activity range, then normal continuous operation of the unit is commenced. During the first part of this period, all the isobutane feed may be supplied through line 11 to further reduce the heat of hydrolysis of the complex liquid to approximately the optimum activity level. The hydrocarbon stream overflowing by line 35 then is passed by valve controlled line 37 to neutralizing equipment indicated by 38, wherein the hydrocarbon is subjected to treatment with caustic soda solution and water-washing in the customary manner. The neutralized hydrocarbon passes by line 39 to depropanizer 40, from which an overhead $C_2$–$C_3$ fraction containing most of the propane is removed in vapor form by line 41. The stabilization in this tower is preferably such as to avoid any appreciable loss of isobutane in the overhead; and for this purpose approximately 5–10% of the original propane may be retained in the bottoms.

The liquid bottoms from depropanizer 40 are passed by line 42 containing pressure reducing valve 43 to debutanizer 44. The latter may be operated to remove overhead substantially all $C_4$, so as to obtain a debutanized total alkylate as bottoms. The overhead is passed by vapor line 45 through condenser 46 to accumulator 47, where the $C_4$ fraction collects as liquid. Any uncondensed lighter material may be removed by vapor line 48. The liquefied $C_4$ fraction is passed by line 50 and valve controlled branch 51 into butane fractionator 52, where the isobutane cut containing a small proportion of residual propane is removed overhead by line 53 and normal butane is removed as bottoms by line 54. Vapors from line 53 pass through condenser 55 into accumulator 56, from where the isobutane is forced by pump 57 through recycle line 58 to line 10. The debutanized alkylate is passed by bottoms line 60 to alkylate fractionator 61, where the desired motor fuel fraction of the alkylate is taken overhead by line 62 and separated from a small amount of heavy bottoms removed by line 63.

As an alternative, tower 44 may be operated as a deisobutanizer to take overhead mainly isobutane with only a small proportion of normal butane, leaving a major proportion of the normal butane in the alkylate bottoms to provide volatility for the motor fuel alkylate. In such case, the liquid condensate from accumulator 47 may be passed directly by valve controlled line 64 to the recycle line 58, or it can be handled in the butane fractionator as previously described.

When the activity of the complex liquid within reactor 16 has dropped to about the optimum level, or somewhat below, then a portion of the isobutane feed is diverted by line 19 through the aluminum chloride saturator 20 to carry a small amount of dissolved aluminum chloride into the reaction zone. The amount of makeup aluminum chloride required to maintain the desired activity level of the catalyst is about 3–12 grams of aluminum chloride per pound of propylene charged. Roughly, about one-half of the isobutane feed for a molar ratio of isobutane to propylene of the range 3:1 to 6:1 will dissolve this required amount of aluminum chloride when operating the saturator at a temperature of about 150–190° F.

Due to the heating of this isobutane solution stream and the exothermic heat of the alkylation reaction, positive cooling of the alkylation reaction zone by the circulation of chilled cooling water is required to maintain that zone at a temperature within the range of 50–90° F. At temperatures below about 50° F., some propylene tends to pass through the system in unreacted form; and at temperatures above about 90° F., the desired high quality of alkylate is not secured. A temperature of about 70° F. in the reaction zone appears to be substantially optimum for the present reaction.

As an alternative, in place of using a portion of the isobutane feed to dissolve aluminum chloride and carry it into the reaction zone, activity of the catalyst can be maintained in continuous operation by supplying a controlled amount of "hot" complex liquid thereto. By "hot" is meant a complex liquid having an absolute heat of hydrolysis in excess of 290 calories per gram, and generally of the order of about 300–330 calories per gram. As shown, hot complex liquid is supplied to a storage tank 70 by line 71, which may receive the same from the spent catalyst discharge line from normal butane isomerization or isobutane-ethylene alkylation. The spent catalysts from both of said operations have heats of hydrolysis of the order stated. This complex liquid is supplied in controlled amount by the valve controlled line 72 to line 25 and thence to reactor 16. In order to prevent undue accumulation of complex liquid in the system during continuous operation, with either the saturator 20 or the hot complex liquid makeup, a portion of the complex liquid may be discharged from the reactor from time to time by the bottom discharge line 37.

In the copending application of Louis A. Clarke and Ernest F. Pevere, Serial No. 469,546, filed December 19, 1942, now Patent No. 2,430,212, dated November 4, 1947, there is disclosed and claimed a two-stage isobutane-ethylene alkylation and isobutane-propylene alkylation, wherein fresh complex liquid is supplied to the ethylene alkylation step, and at least partially spent complex liquid from that step is employed as the catalyst for the propylene alkylation step. The present invention is particularly applicable to a cyclic process of that character wherein the complex supplied through line 71 is the partially spent complex liquid from the ethylene alkylation step, and this hot complex liquid is added from time to time in regulated amount to the reactor 16 to maintain the complex liquid in the propylene alkylation zone within the above specified heat of hydrolysis range. In addition, the ethylene enriched offgas removed from depropanizer 40 by line 41 can be utilized as the charge to the ethylene alkylation stage to provide the countercurrent flow also disclosed and claimed in the said Clarke and Pevere application. Moreover, the complex liquid discharged from reactor 16 by bottom line 37 to maintain the desired catalyst to hydrocarbon volume ratio in the reactor is suitable as makeup complex liquid for isobutane-butylene alkylation as disclosed and claimed in my copending application Serial No. 699,663, filed September 27, 1946.

In order to provide maximum economy in the utilization of aluminum chloride, the cyclic process can include the use of the fresh or most active complex liquid for normal butane isomerization, with the complex liquid discharged therefrom, then passing in series to furnish the catalyst makeup for isobutane-ethylene alkylation, isobutane-propylene alkylation, isobutane-butylene alkylation, isobutane-pentylene alkylation, and finally alkylation of aromatics with suitable alkylating agents, such as olefins, alcohols, esters or others.

While the foreging sequence of operations with the series catalyst flow provides for maximum catalyst life and greatest economy, it is to be understood that the hot complex introduced by line 71 can be the partially spent complex liquid from either normal butane isomerization or isobutane-ethylene alkylation; while the complex liquid discharged from reactor 16 by line 37 can be supplied to any one or more of the above defined hydrocarbon conversions requiring less active catalyst for optimum or improved yield and quality of product.

While the foregoing description sets forth a preferred operation for preconditioning the complex liquid catalyst with the same hydrocarbon feed as is subsequently used in the continuous alkylation operation, this is not essential. Thus, the complex liquid may be preconditioned with a stream of isobutane and a butylene, such as butylene-2, under essentially the conditions specified above for propylene. Any normally gaseous olefin, except ethylene, may be employed in conjunction with isobutane for this purpose. However, it is pointed out that the complex liquid catalyst loses its activity for alkylating ethylene even at temperatures of the order of 110–130° F., at activity levels considerably above the heat of hydrolysis range employed in the present invention.

The characteristics and composition of the complex liquid catalyst are illustrated in the following Table III:

TABLE III
*Analysis of $AlCl_3$-hydrocarbon complex catalyst*

| | Apparent Heat of Hydrolysis Cal./Gr. | Weight Per Cent $AlCl_3$ | Weight Per Cent C | Weight Per Cent $H_2$ |
|---|---|---|---|---|
| 1 | 225 | 55.0 | 36.8 | 4.7 |
| 2 | 237 | 55.9 | 36.3 | 4.7 |
| 3 | 262 | 58.2 | 34.7 | 4.5 |
| 4 | 299 | 59.2 | 32.3 | 4.0 |
| 5 [1] | 330 | 67.2 | 31.9 | 3.9 |

[1] Contained free $AlCl_3$ in solution in the complex liquid.

The high heat of hydrolysis complex of No. 5 in said table is representative of freshly prepared kerosene complex formed as described above. The remaining complex liquids of Nos. 4 to 1, respectively, of said table were obtained at various times in the conditioning period of the fresh complex liquid by reacting the same with isobutane and butylene-2 under alkylating conditions. These values are also representative of the characteristics of complex liquids conditioned with isobutane and propylene.

From the foregoing table it will be seen that a complex liquid having an aluminum chloride content of approximately 55.5–58 weight percent is utilized in the present invention.

Due to the extremely long life of the catalyst, as well as the premium quality of the propylene alkylate for motor fuel, the present invention provides an economical process for utilizing propylene in the production of high octane motor fuel, with material reduction or complete elimination in the utilization of tetraethyl lead. At the same time, the process provides an ethylene off-gas which is substantially free from propylene and is particularly valuable for ethyl alcohol manufacture or isobutane-ethylene alkylation.

Obviously many modifications and variations of the invention, as hereinbefore set forth, may be made without departing from the spirit and scope thereof, but only such limitations should be imposed as are indicated in the appended claims.

I claim:

1. In the continuous alkylation of isobutane with propylene in liquid phase in the presence of an aluminum chloride aliphatic hydrocarbon complex liquid catalyst and a hydrogen chloride promoter, the improvement which comprises initially selecting an aluminum chloride-aliphatic hydrocarbon complex liquid having an absolute heat of hydrolysis in excess of about 300 small calories per gram of complex liquid, pre-conditioning that complex liquid by reaction with isobutane and a normally gaseous olefin of higher molecular weight than ethylene in the absence of added aluminum chloride for a period of time in excess of 18 hours until the complex liquid catalyst contains sufficient reaction product of isobutane and the normally gaseous olefin with the aluminum chloride content of the complex liquid to reduce the absolute heat of hydrolysis of said catalyst to within the range of 245 to 283 small calories per gram of complex liquid, then utilizing the preconditioned complex liquid together with HCl promoter for the continuous alkylation of isobutane with propylene as substantially the sole olefinic reactant under alkylating conditions including liquid phase operation with a catalyst to hydrocarbon volume ratio in the reaction zone of at least 0.6:1 and a temperature of about 50 to 90° F., continuously maintaining the activity of the catalyst liquid in the reaction zone within the absolute heat of hydrolysis range of 245–283 small calories per gram during continuance of the said alkylation reaction by the addition of a controlled small proportion of make-up aluminum chloride equivalent to approximately 3–12 grams per pound of propylene charged, segregating hydrocarbon reaction products from the period when said catalyst liquid is maintained within said low heat of hydrolysis range, and recovering therefrom a debutanized alkylate wherein the 375° F. end point fraction has a clear CFRM octane of at least 83 with a catalyst life in excess of 25 gallons of alkylate per pound of aluminum chloride consumed.

2. The method according to claim 1, wherein the temperature is around 70° F., the absolute heat of hydrolysis of the complex liquid catalyst is about 255–265 and the catalyst to hydrocarbon volume ratio in the reaction zone is maintained within the range of 0.8:1 to 2:1.

ERNEST F. PEVERE.

REFERENCES CITED

The following references are of record in the file of this patent:

UNITED STATES PATENTS

| Number | Name | Date |
|---|---|---|
| 2,308,560 | Carmody et al. | Jan. 19, 1943 |
| 2,360,547 | Chenicek | Oct. 17, 1944 |
| 2,406,721 | Veltman | Aug. 27, 1946 |
| 2,407,390 | Watkins | Sept. 10, 1946 |
| 2,407,873 | Evering et al. | Sept. 17, 1946 |
| 2,410,498 | Hepp | Nov. 5, 1946 |
| 2,415,733 | D'Ouville | Feb. 11, 1947 |